US007218217B2

(12) United States Patent
Adonailo et al.

(10) Patent No.: US 7,218,217 B2
(45) Date of Patent: May 15, 2007

(54) FALSE ALARM REDUCTION IN SECURITY SYSTEMS USING WEATHER SENSOR AND CONTROL PANEL LOGIC

(75) Inventors: Robert S. Adonailo, Rockville Centre, NY (US); Tony T. Li, Roslyn Heights, NY (US); David S. Zakrewski, Babylon, NY (US)

(73) Assignee: Honeywell International, Inc., Morristown, NJ (US)

( * ) Notice: Subject to any disclaimer, the term of this patent is extended or adjusted under 35 U.S.C. 154(b) by 160 days.

(21) Appl. No.: 10/911,943

(22) Filed: Aug. 5, 2004

(65) Prior Publication Data

US 2006/0028334 A1 Feb. 9, 2006

(51) Int. Cl.
*G08B 19/00* (2006.01)
*G01W 1/00* (2006.01)

(52) U.S. Cl. ................. 340/522; 340/601; 340/539.28; 702/3

(58) Field of Classification Search ................ 340/522, 340/600, 539.28, 601; 702/3
See application file for complete search history.

(56) References Cited

U.S. PATENT DOCUMENTS 4,608,674 A * 8/1986 Guscott ........................ 367/93
5,239,459 A * 8/1993 Hunt et al. .................... 700/90
5,978,738 A * 11/1999 Brown .......................... 702/3
6,255,942 B1 * 7/2001 Knudsen ..................... 340/506
2002/0055820 A1 * 5/2002 Scannell ........................ 702/3

OTHER PUBLICATIONS

Data Sheet for Honeywell Ademco 5800SS1 Wireless Shock Sensor, 1 p., printed May 27, 2004 from http://www.ademco.com/ademco/products/wireless/5800SS1.htm.
Data Sheet for Honeywell Ademco 5853 Wireless Glassbreak Detector, 1 p., printed May 27, 2004 from http://www.ademco.com/ademco/products/wireless/5853.htm.
"NOAA Weather Radio", 2 pp., printed May 27, 2004 from http://www.nws.noaa.gov/nwr.
"NWR Specific Area Message Encoding (SAME)", 2 pp., printed May 27, 2004 from http://www.nws.noaa.gov/nwr/nwrsame.htm.
"Using NWR SAME", 2 pp., printed May 27, 2004 from http://www.nws.noaa.gov/nwr/same.htm.
"How WeatherHawk works in home automation," 3 pp., printed Jul. 6, 2004 from http://www.weatherhawk.com/applications-homes.htm.

(Continued)

*Primary Examiner*—Donnie L. Crosland
(74) *Attorney, Agent, or Firm*—Scully, Scott, Murphy & Presser, P.C.

(57) ABSTRACT

A security system that secures a building includes a weather detector for detecting weather conditions, such as thunder or high winds, which are likely to cause false alarms in sensors such as an acoustic glass break sensor, shock sensor and vibration sensor. The weather detector may include a sensing component that senses atmospheric conditions external to the building, such as temperature, pressure, wind speed and/or lightning. The weather detector may also include a component for receiving a data communication, such as from a radio, Internet, or telephone link, indicating that the weather condition is present in a vicinity of the building. The security system operates in a bad weather mode by requiring corroboration of intrusion detection signals from the sensors that can cause false alarms.

21 Claims, 3 Drawing Sheets

OTHER PUBLICATIONS

Data Sheet for Boltek Storm Tracker Lightning Detection System, 4 pp., printed May 27, 2004 from htp://www.boltek.com/stracker.htm.

Data Sheet for StrikeAlert Personal Lightning Detector, 3 pp., printed May 27, 2004 from http://www.strikealert.com/ProductInfo.htm.

* cited by examiner

FALSE ALARM REDUCTION IN SECURITY SYSTEMS USING WEATHER SENSOR AND CONTROL PANEL LOGIC

BACKGROUND OF THE INVENTION

1. Field of Invention

The invention relates generally to security systems and, more particularly, to a method and apparatus for reducing false alarms in security systems by using a weather sensor that detects weather conditions that can cause false alarms.

2. Description of Related Art

Security systems, such as for homes and businesses, have become commonplace as people seek to protect themselves and their property. Home security systems typically employ sensors at entry points, such as windows and doors, along with interior sensors such as motion detectors, vibration sensors, shock sensors, and glass break sensors. However, false alarms have become a growing problem with such systems. False alarms lead to the unnecessary dispatch of emergency personnel such as police and fire personnel. Moreover, the problem has become so great in some areas that local governments levy fines against home and business owners who cause such unnecessary dispatches. Even worse, alarms may be ignored altogether for chronic offenders. False alarms in a security system can be caused by various factors, including loud noises and vibrations caused by trucks, construction, aircraft and weather conditions.

BRIEF SUMMARY OF THE INVENTION

The present invention addresses the above and other issues by providing a method and apparatus for reducing false alarms in security systems by detecting weather conditions such as thunderstorms and high winds that can cause false alarms, and modifying the decision criteria used by the security system's control in determining whether to trigger an alarm.

In one aspect of the invention, a security apparatus includes a control for controlling a security system that secures a building, a first sensor for detecting an intrusion into the building, and means for determining whether a weather condition is present. The control determines whether to trigger an alarm responsive to an intrusion detection signal from the first sensor, and a signal from the determining means indicating whether the weather condition is present. The control determines whether to trigger the alarm by applying a first decision criteria when the weather condition is not present, and applying a second decision criteria when the weather condition is present.

A corresponding method and program storage device are also provided

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
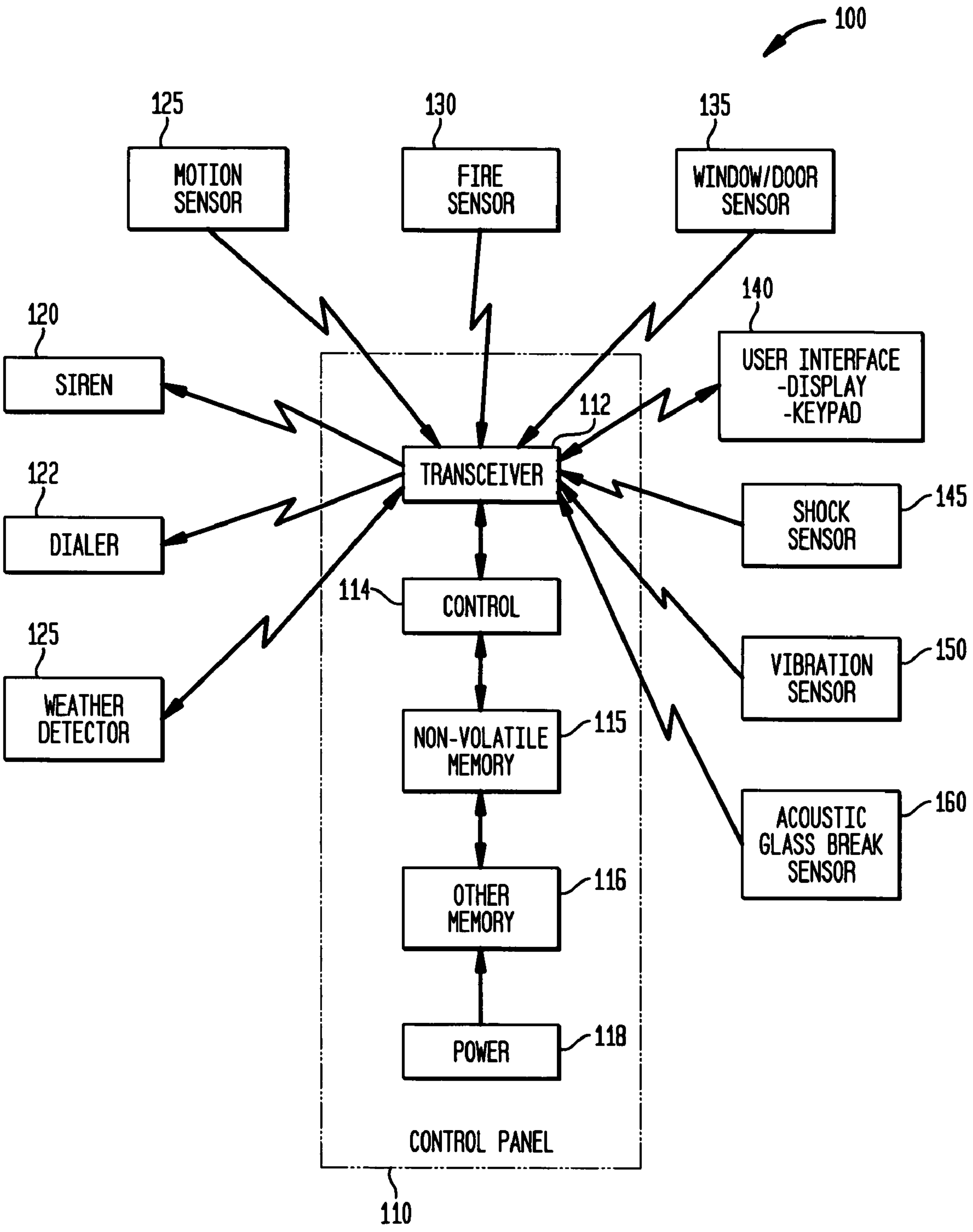
FIG. 1 illustrates an overview of an example security system including a weather detection component, according to the invention.

FIG. 1 illustrates an overview of an example security system, according to the invention. An example security system 100 includes a central control panel 110 that communicates with a number of sensors via a wired or wireless path. For example, a motion sensor 125 detects when a person enters a room, a fire sensor 130 indicates that a fire has been detected, and window and door sensors 135 indicate that a window or door has been opened. These sensors may include, e.g., magnetic contact sensors that detect movement of a door or window. For example, a reed switch may be embedded in a door frame or window frame, and a magnet may be embedded in alignment with the switch in the door or window sash, respectively. The magnet holds the contacts of the reed switch closed until the door or window is open, causing an intrusion detection signal to be sent to the control panel 110. Such sensors are reliable and generally immune to weather conditions.

Other types of sensors that may be used include a shock sensor 145, a vibration sensor 150, and an acoustic glass break sensor 160. The shock sensor 145 can be mounted on or near a door or window, for example, to detect a shock that occurs when a burglar strikes the door or window with a hard object, for instance. The vibration sensor 150 is typically mounted on ceilings, walls, safes or glass to detect vibrations. The acoustic glass break sensor 160 is typically mounted on a wall or ceiling in a room and uses a microphone to listen for the sound of breaking glass. These sensors are generally of the type that are subject to indicate a false intrusion detection due to the presence of a weather condition such as thunder or high winds because such conditions cause many of the shock, vibration and acoustic characteristics that these sensor are designed to detect. For example, high winds can cause vibration in windows, doors and walls of a building, or cause objects such as tree limbs to repeatedly strike a building. Thunder similarly causes vibrations and shocks.

A peripheral user interface device 140, such as a keypad and display, a combined display and touch screen, and/or a voice interface, may be used to arm and disarm the system. The user interface device 140 may be the primary interface between the human user and the security system 100 when the user is in the home. The user interface device 140 typically includes components that are analogous to the control panel 110, including a control, memory and power source. The user interface device 140 is commonly provided as a wireless device to allow it to be permanently installed in the home without running wire, such as by affixing it to a wall or placing it on a table, for instance. The control panel 110 generally is a larger component that may be installed in an unobtrusive location in the home, such as a closet or basement. However, it is not necessary for the user interface device 140 to be separate from the control panel 110, or to communicate by wireless signals with the control panel 110. For example, the user interface device 140 may be integrated into the control panel 110.

The control panel 110 may also transmit signals to components of the security system 100. For example, signals may be transmitted to a siren 120 to activate the siren when an alarm condition is detected. Signals may be sent to the user interface device 140 to display status information to the user, such as whether the system is armed or disarmed, whether a specific door or window has been opened, and, whether an alarm has been tripped. The control panel 110 may also have the ability to notify local emergency services and/or a remote monitoring station of an alarm condition via a telephone dialer 122. Other communication paths such as long-range radio may also be used. The dialer 122 is typically hardwired to the control panel 110 and activated by the control 114.

To facilitate installation and avoid the need to install wiring in a home, wireless security system components may be employed. Some components only transmit or receive. For example, the motion sensors 125, fire sensors 130, window/door sensors 135, shock sensor 145, vibration sensor 150 and acoustic glass break sensor 160 typically only transmit back to the control panel 110 when they are tripped, while the siren 120 only receives a signal from the control panel 110 when the control panel 110 detects an alarm condition based on a signal received from one of the sensors. The user interface device 140 may have both transmit and receive capabilities to communicate with the control panel 110. The wireless security system components may use radio frequency (RF) signals. One common system uses signals at 345 MHz to provide a nominal indoor range of 200 feet and an outdoor range of up to one mile.

The control panel 110 includes a transceiver 112 for transmitting and receiving wireless signals. The control 114 includes a microprocessor that may execute software, including, e.g., firmware, micro-code or the like to implement logic to control the security system 100 and achieve the functionality discussed herein. A non-volatile memory 115 and other additional memory 116 may be provided as required. A memory resource used for storing software or other instructions that are executed by the control 114 to achieve the functionality described herein may be considered a program storage device. A dedicated chip such as an ASIC may also be used. Generally, each wireless component of the security system must be "learned" by the control 114. In the learning process, data is stored in the non-volatile memory 115 that identifies the characteristics of each sensor, including the sensor type, serial number or other code or identifier, and what type of action to take based on signals received from each sensor. For example, the action may be to provide a status message to the user, store data for subsequent maintenance purposes, or trip an alarm. A power source 118 provides power to the control panel 110 and typically includes a battery backup to AC power.

Furthermore, according to the invention, data may be stored indicating whether the sensor is of a type that is subject to indicating a false intrusion detection due to the presence of a weather condition. In one possible approach, data is stored in the non-volatile memory 115 that flags specified sensors as being subject to false alarms. Thus, when the control receives an intrusion detection signal from such a sensor, it can implement different decision-making criteria in deciding whether to trigger an alarm. For example, when the control 114 is informed by the weather detector 125 that the weather condition is present, the control 114 can implement a more strict decision-making criteria in determining whether to trigger an alarm, as described further below.

According to the invention, the security system 100 can be modified to include a weather detector 125 that can include any means for determining whether a weather condition such as thunder or high winds is present in a vicinity of the building that is secured by the security system 100. In one approach, the weather detector 125 includes one or more sensing components that sense atmospheric conditions external to the building to determine if the specified weather condition is present. In another possible approach, the weather detector 125 includes a data-receiving component that receives a data communication indicating whether the weather condition is present in a vicinity of the building. Intelligence for determining whether the weather condition is present can be located in the weather detector 125 and/or the control 114 of the security system 100.

Advantageously, the weather detector 125 can be easily incorporated into an existing security system by providing a software upgrade to the control 114 that allows the control 114 to recognize communications from the weather detector 125 and implement related decision making logic. Moreover, the weather detector 125 can use the same communications protocol as other sensors in the security system, such as sensors 125, 130 and 135 that send a signal to the control panel 110 when they detect an intrusion. The weather detector 125 can send a signal to the control panel 110 when it determines that the weather condition is present. In another approach, the weather detector 125 sends data from its sensors that the control 114 processes to determine whether the weather condition is present and optionally, the severity and/or type of the condition.

Figure 2:
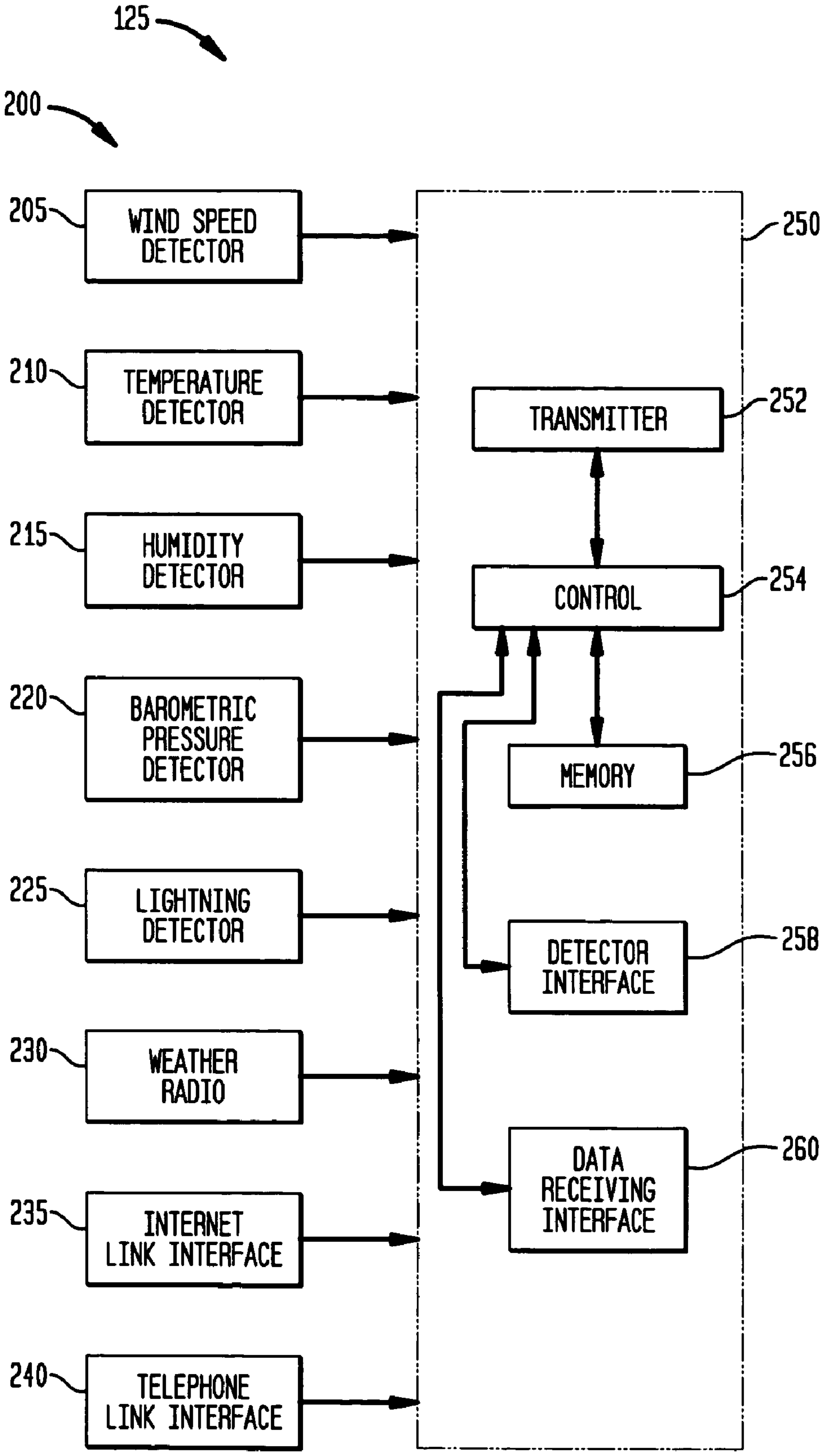
FIG. 2 illustrates an example weather detector, according to the invention.

FIG. 2 illustrates an example weather detector, according to the invention. The weather detector 125 includes one or more of example sensors and data receiving components, shown generally at 200, and a data processing component 250. The sensing components 205, 210, 215, 220 and 225 may be mounted outside a house, for instance, for sensing conditions in the atmosphere. The sensing components may include a wind speed detector or anemometer 205, a temperature detector 210, a relatively humidity detector 215, a barometric pressure detector 220, and a lightning detector 225. Each of the sensing components may be provided using commercially available products to obtain a reading and convert it to an electrical signal that can be processed and communicated. The sensing components may periodically take readings and communicate them to the data processing component 250, which includes a detector interface 258 for interfacing with the sensing components. Separate interfaces may be provided for each sensing component as needed. The control 254 processes the readings from the sensing components by implementing control logic from software stored in the memory 256, in one possible approach, to determine whether a specified weather condition is present.

For example, the control 254 may determine whether the readings from the wind speed detector 205 exceed a threshold wind speed, such as 30 mph, which is likely to cause false alarms in the security system. An additional criteria regarding the duration of the wind gusts may also be imposed. When the wind speed exceeds the specified threshold, the weather detector 125 may communicate a signal to the control 114 of the security system via the transmitter 252 indicating that the weather condition is present. The transmitter 252 may transmit a wireless signal to the transceiver 112, for example, or be hard wired to the control panel 110 (see also FIG. 1).

The barometric pressure, temperature and humidity can also be measured and used to predict whether the specific weather condition is present. For example, a dropping barometric pressure is correlated with the onset of a storm. A sudden drop in temperature and change in the wind can also mean that a storm is approaching. The weather conditions can be predicted using known techniques based on the atmospheric readings. A probability measure may be implemented by the control 254, e.g., to predict whether there is a 70% or more probability that a thunderstorm is in the vicinity of the building secured by the security system.

Regarding the lightning detector 225, some commercially available devices predict the presence of lightning by detecting the radio signals produced by lightning. Such devices indicate that thunder is likely to be present as well since the presence of lightning is a strong indicator of the presence of thunder. The StormTracker lightning detection system, available from Boltek Corp., Buffalo, N.Y., is one example product. In this system, a directional antenna obtains information on the direction of the storm, while the distance of the storm is determined based on the received signal strength. Multiple lightning strikes can be tracked over time to determine whether the storm is approaching the building and/or getting stronger or weaker. The antenna can be mounted either outdoors for best results, or indoors, if the building is a wood frame structure. The antenna is connected by cable to a peripheral component interconnect (PCI) receiver card that can be interfaced with the detector interface 258 using hardware and/or software techniques that are available to those skilled in the art.

Regarding the weather radio 230, such radios are readily available for receiving a data communication such as an alert indicating that stormy weather conditions are present in a specific locality. For example, the National Weather Service (NWS) radio service is provided in the U.S. by the National Oceanic and Atmospheric Administration (NOAA). This radio service broadcasts warnings, watches and non-weather related emergency messages that can be received on specified broadcast frequencies. The Specific Area Message Encoding (SAME) feature allows radios to be programmed to receive only the communications that relate to specific geographic areas such as a county, parish or city. Accordingly, the weather radio 230 can be programmed to receive only weather alerts that relate to the vicinity of the building that is secured by the security system 100. The data-receiving interface 260 represents an interface that informs the control 254 of when a radio alert is received. A corresponding signal can be sent to the control panel 110 via the transmitter 252.

Regarding the Internet link interface 235, this represents an interface to the Internet or any computer network through which data can be received, e.g., via a network interface card. Various techniques are available to recover data via a computer network indicating that a specific weather condition is present. For example, the owner of the building that is secured by the security system 100 may register on a web site to receive a message using a push technology. The owner enters the location of the building, such as by zip code, and the web site analyzes weather data from an on-line weather service to determine when the specified weather condition is present in the vicinity of the building. When the weather condition is present, the web site communicates a message, such as a TCP/IP message, that is received by the Internet link interface 235. The data-receiving interface 260 informs the control 254 of when such a message is received, and a corresponding signal can be sent to the control panel 110 via the transmitter 252.

Regarding the telephone link interface 240, this represents an interface to a telephone network through which data can be received, e.g., via a modem. As with the Internet example, the owner of the building that is secured by the security system can register with a service provider, which may be the same as the organization that performs remote monitoring of the security system, to receive a message using a push technology when the weather condition is present. Again, the data-receiving interface 260 informs the control 254 of when such a message is received, and a corresponding signal can be sent to the control panel 110 via the transmitter 252. Various other channels for communicating data to the security system may also be used, such as cell phone transmissions, cable or satellite television transmissions, long-range radio transmissions, and so forth.

The intelligence for determining whether a specific weather condition is present can be carried out in the control 254 of the weather detector 125 and/or the control 114 of the security system's control panel 110. For example, when wind speed is measured, the weather detector 125 may periodically communicate data regarding the wind speed to the control 114, where control logic is executed to determine whether the wind speed exceeds a specified threshold for a specified period of time. The control 114 may be configured with the appropriate software via a local or remote software download, for example. If the wind speed exceeds a specified threshold, the control 114 sets a flag such as weather_condition_present=yes or high_winds=yes. Otherwise, the control 114 sets weather_condition_present=no or high_winds=no. In another approach, the weather detector 125 executes control logic to determine whether the wind speed exceeds the specified threshold. Optionally, further details regarding the weather condition can be provided, such as the severity of the condition. For instance, regarding wind speed, a speed of 30–50 mph can correspond with one severity level, while a speed of above 50 mph corresponds with another severity level. Thus, the security system 100 can be apprised of the presence of a weather condition that is likely to result in false alarms by certain types of sensors in the security system. As explained further below, the control 114 of the security system can operate in different modes depending on whether or not the weather condition is present to reduce or avoid false alarms.

Figure 3:
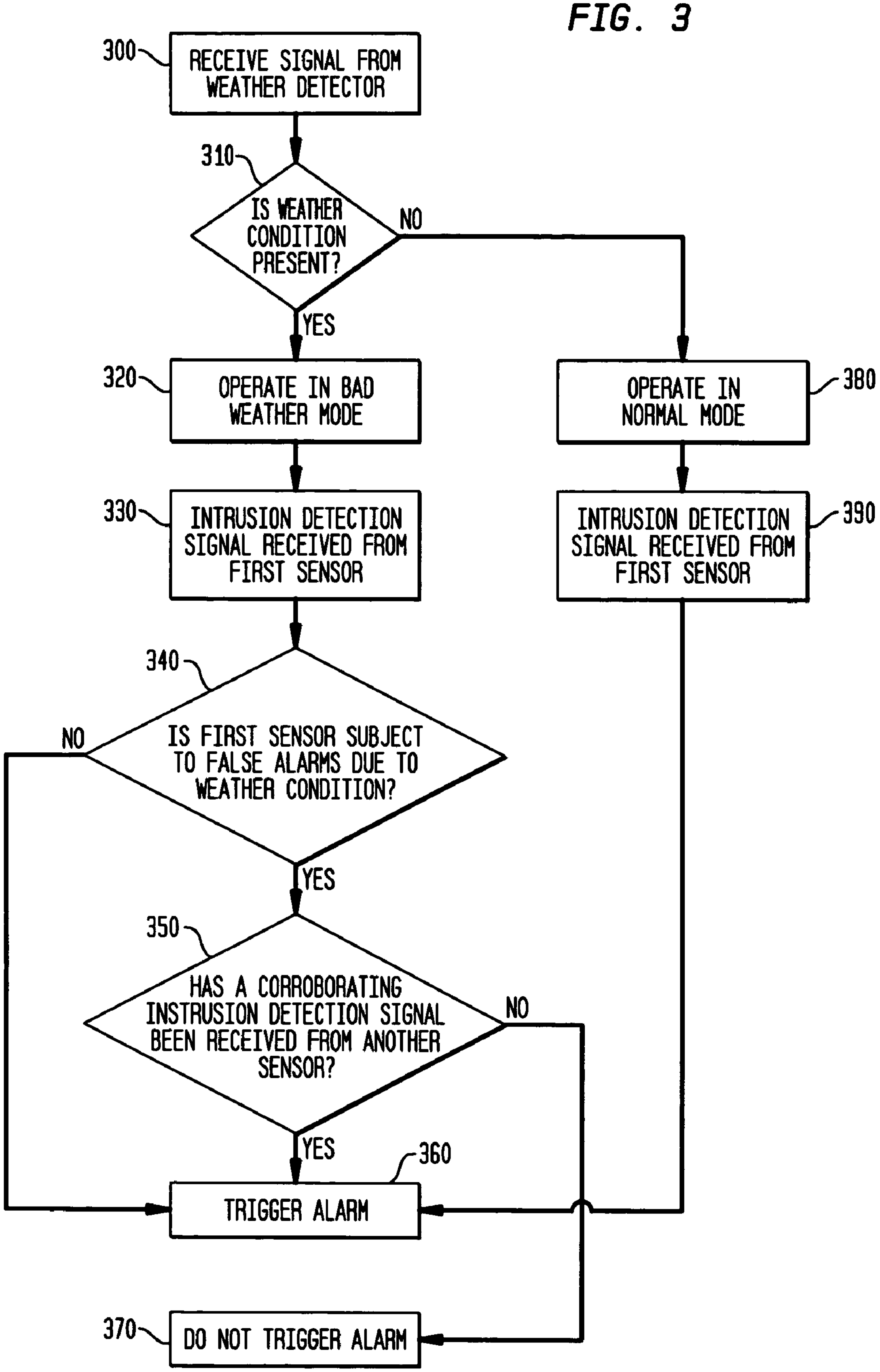
FIG. 3 illustrates an example process used by a control in determining whether to trigger an alarm, according to the invention.

FIG. 3 illustrates an example process used by a control in determining whether to trigger an alarm, according to the invention. The process begins with the control 114 receiving a signal from the weather detector 125. If the signal indicates that the weather condition is present (block 310), the control operates in a "bad weather" mode (block 320). Otherwise, the control 114 operates in the normal mode (block 380). In the normal mode, the receipt of an intrusion detection signal from a first sensor is sufficient, by itself, to cause the control to trigger an alarm (block 360). In the bad weather mode, the control 114 determines whether the first sensor is of the type that is subject to indicating a false intrusion detection due to the presence of a weather condition (block 340). If the first sensor is not of this type, e.g., the sensor is not an acoustic glass break sensor, shock sensor and vibration sensor, the control 114 triggers an alarm.

If the first sensor is of the unreliable type, the control 114 further determines whether there is a corroborating intrusion detection signal from at least a second sensor for detecting an intrusion into the building (block 350). The second sensor should be of the type that is not subject to indicating a false intrusion detection due to the presence of a weather condition. For example, a motion detector or a sensor that detects movement of a door or window may be used to corroborate the first sensor. At block 360, if there is such corroboration, the control 114 triggers an alarm. If there is no such corroboration, the control 114 does not trigger an alarm.

The control 114 can thus operate in at least two modes based on the detected weather. Note that it is also possible to provide additional operating modes, e.g., depending on the severity of the weather or other factors. Essentially, the control panel changes the way it processes inputs based on the concept that it knows whether a specified weather condition is present.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A security apparatus, comprising:

a control for controlling a security system that secures a building;

a first sensor for detecting an intrusion into the building; and means for determining whether a weather condition is present in a vicinity of the building;

wherein the control determines whether to trigger an alarm responsive to an intrusion detection signal from the first sensor, and a signal from the detennining means indicating whether the weather condition is present.

2. The security apparatus of claim 1, wherein:

the control determines whether to trigger the alarm by applying a first decision criteria when the weather condition is not present, and applying a second decision criteria when the weather condition is present.

3. The security apparatus of claim 1, wherein:

the control determines whether the first sensor is of a type that is subject to indicating a false intrusion detection due to the presence of the weather condition.

4. The security apparatus of claim 3, wherein:

the type that is subject to indicating a false intrusion detection due to the presence of a weather condition comprises at least one of an acoustic glass break sensor, shock sensor and vibration sensor.

5. The security apparatus of claim 3, wherein:

when the control determines that the first sensor is not of the type that is subject to indicating a false intrusion detection due to the presence of the weather condition, the intrusion detection signal from the first sensor is sufficient to cause the control to trigger the alarm regardless of whether the weather condition is present; and when the control determines that the first sensor is of the type that is subject to indicating a false intrusion detection due to the presence of the weather condition, and the weather condition is present, the intrusion detection signal from the first sensor is not sufficient, by itself, to cause the control to trigger the alarm.

6. The security apparatus of claim 5, wherein:

when the control determines that the first sensor is of the type that is subject to indicating a false intrusion detection due to the presence of the weather condition, and the weather condition is present, the intrusion detection signal from the first sensor must be corroborated by an intrusion detection signal from at least a second sensor for detecting an intrusion into the building to cause the control to trigger the alarm.

7. The security apparatus of claim 6, wherein:

the at least a second sensor comprises at least one of a motion detector and a sensor that detects movement of a door or window.

8. The security apparatus of claim 1, wherein:

the weather condition comprises at least one of thunder and high winds.

9. The security apparatus of claim 1, wherein:

the determining means comprises a sensing component that senses atmospheric conditions external to the building.

10. The security apparatus of claim 9, wherein:

the sensing component senses at least one of lightning and high winds.

11. The security apparatus of claim 1, wherein:

the determining means receives a data communication indicating whether the weather condition is present.

12. A method for use by a control of a security system for securing a building, comprising:

receiving a signal indicating whether a weather condition is present in a vicinity of the building;

receiving an intrusion detection signal from a first sensor of the security system that detects an intrusion into the building; and determining whether to trigger an alarm responsive to the receiving the intrusion detection signal from the first sensor, and according to the signal indicating whether the weather condition is present.

13. The method of claim 12, wherein:

the weather condition comprises at least one of thunder and high winds.

14. The method of claim 12, wherein:

the determining comprises determining whether to trigger the alarm by applying a first decision criteria when the weather condition is not present, and applying a second decision criteria when the weather condition is present.

15. The method of claim 12, further comprising:

determining whether the first sensor is of a type that is subject to indicating a false intrusion detection due to the presence of the weather condition; wherein:

when the first sensor is not of the type that is subject to indicating a false intrusion detection due to the presence of the weather condition, the intrusion detection signal from the first sensor is sufficient to cause the control to trigger the alarm regardless of whether the weather condition is present; and when the first sensor is of the type that is subject to indicating a false intrusion detection due to the presence of the weather condition, and the weather condition is present, the intrusion detection signal from the first sensor is not sufficient, by itself, to cause the control to trigger the alarm.

16. The method of claim 15, wherein:

when the first sensor is of the type that is subject to indicating a false intrusion detection due to the presence of the weather condition, and the weather condition is present, the intrusion detection signal from the first sensor must be corroborated by an intrusion detection signal from at least a second sensor for detecting an intrusion into the building to cause the control to trigger the alarm.

17. A program storage device, tangibly embodying a program of instructions executable by a control in a security system to perform a method for securing a building, the method comprising:

receiving a signal indicating whether a weather condition is present in a vicinity of the building;

receiving an intrusion detection signal from a first sensor of the security system that detects an intrusion into the building; and determining whether to trigger an alarm responsive to the receiving the intrusion detection signal from the first sensor, and according to the signal indicating whether the weather condition is present.

18. The program storage device of claim 17, wherein:

the weather condition comprises at least one of thunder and high winds.

19. The program storage device of claim 17, wherein:

the determining comprises determining whether to trigger the alarm by applying a first decision criteria when the weather condition is not present, and applying a second decision criteria when the weather condition is present.

20. The program storage device of claim 17, wherein the method further comprises:

determining whether the first sensor is of a type that is subject to indicating a false intrusion detection due to the presence of the weather condition; wherein:

when the first sensor is not of the type that is subject to indicating a false intrusion detection due to the presence of the weather condition, the intrusion detection signal from the first sensor is sufficient to cause the control to trigger the alarm regardless of whether the weather condition is present; and when the first sensor is of the type that is subject to indicating a false intrusion detection due to the presence of the weather condition, and the weather condition is present, the intrusion detection signal from the first sensor is not sufficient, by itself, to cause the control to trigger the alarm.

21. A system for securing a building, comprising:

a control operable to receive a signal from a weather detector, the control further operable to receive an intrusion detection signal from a first sensor and to determine if the first sensor is of type that is subject to indicating a false intrusion detection due to the presence of the weather condition, the control further operable to determine if a corroborating intrusion detection signal is received from a second sensor; and decision means operable to decide to trigger an intrusion alarm when a weather condition is present and when the intrusion detection signal is from a sensor that is of type that is subject to indicating a false intrusion detection due to the presence of the weather condition, if a corroborating intrusion detection signal is received.

* * * * *